United States Patent [19]

Morency et al.

[11] Patent Number: 5,064,268

[45] Date of Patent: Nov. 12, 1991

[54] HIGH PRESSURE FIBER OPTIC CONNECTOR PLUG

[75] Inventors: Roger L. Morency, Voluntown; Gerald E. Holmberg, Quaker Hill, both of Conn.

[73] Assignee: The United States of America as represented by the Secretary of the Navy, Washington, D.C.

[21] Appl. No.: 625,720

[22] Filed: Dec. 7, 1990

[51] Int. Cl.$^5$ .............................................. G02B 6/44
[52] U.S. Cl. ........................................ 385/87; 385/69
[58] Field of Search ............... 350/96.23, 96.20, 96.22

[56] References Cited

U.S. PATENT DOCUMENTS

| | | | |
|---|---|---|---|
| 4,595,256 | 6/1986 | Guazzo | 350/96.23 |
| 4,632,507 | 12/1986 | Mignien et al. | 350/96.20 |
| 4,634,214 | 1/1987 | Cannon et al. | 350/96.23 |
| 4,699,459 | 10/1987 | Priaroggia | 350/96.23 |
| 4,722,589 | 2/1988 | Piaroggia | 350/96.23 |
| 4,722,590 | 2/1988 | Thomas | 350/96.23 |
| 4,744,622 | 5/1988 | Cherry et al. | 350/96.20 |
| 4,974,926 | 12/1990 | Blee et al. | 350/96.23 |

*Primary Examiner*—William L. Sikes
*Assistant Examiner*—Robert E. Wise
*Attorney, Agent, or Firm*—Michael J. McGowan; Prithvi C. Lall; Michael F. Oglo

[57] ABSTRACT

A fiber optic cable connection for high pressure environments utilizes a fiber optic cable having (i) a multiplicity of fiber optic strands extending axially therein, (ii) a strength member extending axially in spaced relationship thereabout, (iii) an outer jacket, and (iv) a filler matrix within the strength member and in which the strands are encased, a precision connector with an inner face having an axially extending recess and with axially extending passages extending from the transverse wall of the recess to the outer face of the connector member and through which the fiber optic strands extend. A preload insert member is disposed about the strands with its outer end extending into the recess of the connector and a peripheral shoulder abutting the inner face of the connector member. The strength member of the cable is disposed about extending the reduced diameter portion of the insert member. A body member is disposed about the insert member and has its outer end extending over the inner end portion of the connector. A nut threadably engaged on the inner end portion of the insert member and abutting the inner end of the body member is tightened on the insert member against the body member to tension the insert member above a predetermined value. A relatively rigid resin filler is provided in the insert member about the strands connector member, and a relatively compressible filler in the inner end of the insert member, and a sealing boot extending about the cable jacket over the strength member and nut and onto the body member.

21 Claims, 2 Drawing Sheets

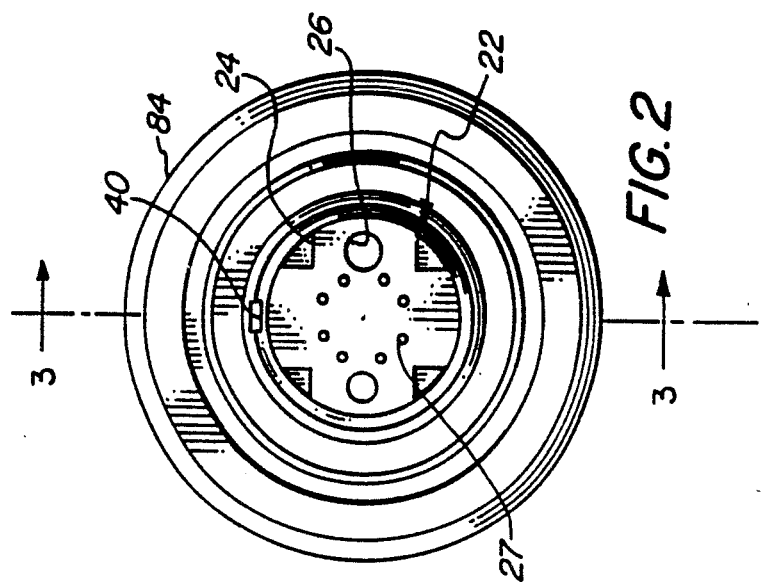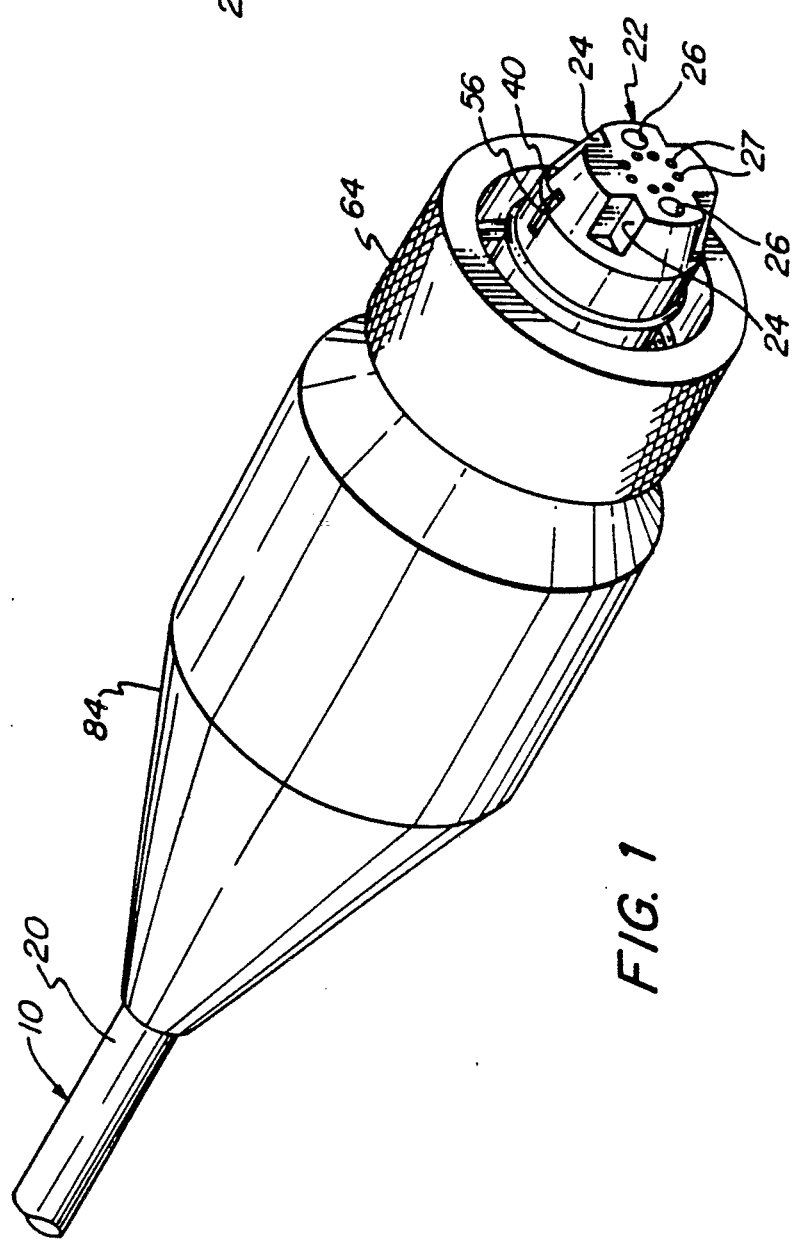

HIGH PRESSURE FIBER OPTIC CONNECTOR PLUG

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

The present invention relates to cable connectors, and more particularly, to fiber optic cable connectors which are adapted to use in high pressure environments.

Fiber optics are now widely employed for many applications wherein signal transmission is intended to be effective with minimal effect upon the quality of the signal over extended distances and under varying environmental conditions. Various types of connectors have been developed for coupling a fiber optic cable to a suitable receptacle, and the principles are now well known and widely utilized to effect such connections with minimal interference at the abutting ends.

However, although the connectors for making such connections at atmospheric pressures are readily available, connectors capable of withstanding high pressures such as found at great depths within the ocean represent a continuing challenge. In such an environment, the pressure tends to produce water intrusion into the connector and interfere with the quality of the connection, and to cause its rapid destruction. This may result from the relative motion on the components under the hydrostatic pressure. To be effective, the connector must be capable of providing a good connection between the fiber optic cable and the cooperating optic cable elements of the receptacle, both at ambient pressures and at the high pressures to be found in the depths of the ocean, i.e., up to 10,000 p.s.i. and even higher.

It is an object of the present invention to provide a novel connection for fiber optic cables which is adapted to use both in ambient pressure environments and in high pressure environments.

It is also an object to provide such a connection in which the connection is substantially free from water intrusion and relative motion of components at pressures of up to 10,000 p.s.i.

Another object is to provide such a connection in which components of the connector may be tensioned to anticipated operating pressures for the connection.

SUMMARY OF THE INVENTION

It has been found that the foregoing and related objects may be readily attained in a connection for a fiber optic cable having a multiplicity of fiber optic axially extending strands extending axially therein, a strength member, an outer jacket, and a filler matrix encasing the strands within the strength member. A precision connector member of generally circular cross section has an outer face configured to mate with a cooperating connector member, an inner face with an axially extending recess, and axially extending passages extending from the transverse wall of the recess to its outer face. The strands extend outwardly of the strength member and filler matrix of the cable and through these passages to the outer face of the connector member. A rigid resin is provided about the strands in the portion of the recess adjacent the transverse wall.

A generally cylindrical preload insert member extends about the strands, and it has its outer end extending into the recess of the connector member and a peripheral shoulder abutting the inner face of the connector member. Usually, the inner end portion of the insert member is of reduced diameter and providing a relatively thin wall, and the strength member has its outer end portion extending outwardly of the end of the jacket and onto this reduced diameter portion. A body member of circular cross section in turn is disposed about the insert member, and it has its outer end extending over the inner end portion of the connector member and a radially outwardly extending flange about its periphery thereof.

A nut is threadably engaged on the inner end portion of the insert member and abuts the inner end of the body member, and the nut is tightened on the insert member against the body member to tension the insert member above a predetermined value. A washer is provided between the nut and body member.

Usually, a relatively compressible resin filler is provided about the strands in the reduced diameter portion of the insert member, and a relatively rigid resin filler is provided in the insert member about the strands between the relatively compressible filler and the connector member. Most usually, the reduced diameter position of the insert member is crimped to place the relatively compressible resin filler under compression.

Clamping means clamps the strength member to the reduced diameter end portion of the preload insert member, and a sealing boot extends about the cable jacket over the strength member and nut and onto the body member. Most usually, the clamping member is crimping sleeve.

Most usually, a coupling nut extends about the body member and it has an inwardly extending flange on its inner end abutting the inner face of the flange on the body member and coupling means in its outer portion for engagement with cooperating coupling means of the cooperating connector member. The insert member has an outer end portion of lesser diameter extending inwardly of the recess in the connector member and providing the shoulder abutting the inner face thereof. Desirably, the connector member has an axially extending groove in its outer surface and the outer end of the body member has a portion which extends thereinto. The connector member has a circumferential groove underlying the body member, and sealing means is seated therein to effect a seal between the connector and the body member. The outer face of the connector member has recesses therein to effect alignment with the cooperating connecting member.

BRIEF DESCRIPTION OF THE DRAWINGS

FIG. 1 is a perspective view of a connector embodying the present invention as shown at the end of a fragmentarily illustrated fiber optic cable;

FIG. 2 is a front elevational view of the connector; and

DESCRIPTION OF THE PREFERRED EMBODIMENT

Figure 3:
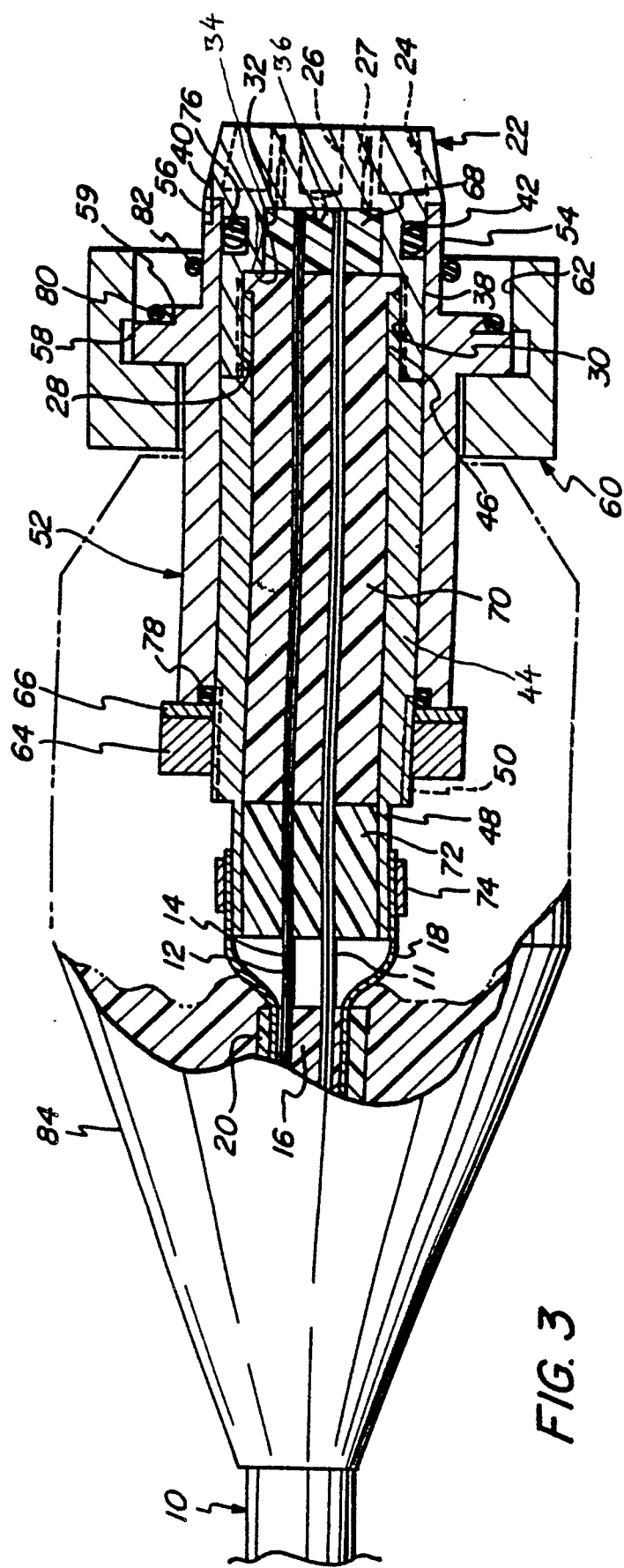
FIG. 3 is a side elevational view of the connector in partial section substantially along the line 3—3 of FIG. 2 and drawn to a greatly enlarged scale.

Turning now in detail to the attached drawings, a fiber optic cable of the type with which the connector is generally employed is illustrated in partial section at the left hand portion of FIG. 3. The fiber optic cable is generally designated by the numeral 10 and has therewithin a multiplicity of fiber optic conductors 11 each comprising a fiber optic filament 12 within a cylindrical jacket 14. The several fiber optic conductors 11 are disposed within a matrix or body of void-filling synthetic resin designated by the numeral 16, and surrounding or dispersed within the body 16 is a strength member 18 generally comprised of high strength filament. Lastly, the cable has an outer jacket 20 of synthetic resin.

The connector of the present invention includes a precision insert generally designated by the numeral 22 which has its outer face configured to mate with a cooperatively configured receptacle. As seen, the outer face has four generally triangular recesses 24, and a pair of diametrically spaced circular recesses 26 formed therein. As also seen, the insert 22 has a series of passages 27 extending axially therethrough and in which are seated the fiber optic filament 12 with their ends exposed at the outer face of the insert 22.

The inner face of the insert 22 has a relatively deep stepped recess 28 formed therein with a larger diameter portion 30 at its inner end and a smaller diameter portion 32, thus forming a radially extending shoulder 34 therebetween. The inner end of the smaller diameter portion 32 is defined by the wall 36 from which the passages 27 extend to the outer face of the insert 22.

The inner end of the precision insert 22 has a reduced outer diameter to provide a circumferential recess 38 thereabout and it has an axially extending keyway 40 in its outer end portion. Adjacent the outer end of the recess 38 and the inner end of the keyway 40 is a circumferential groove or channel 42.

A preload insert cylinder is generally designated by the numeral 44, and its outer end portion 46 is of reduced outer diameter and threadably engaged with the inner surface of the larger diameter portion 30 of the recess 28 in the precision insert 22. The insert cylinder 44 also has a reduced diameter inner end portion 48. Adjacent the inner end of the larger diameter portion, the preload insert cylinder 44 is externally threaded as indicated by the numeral 50 for a purpose to be described hereinafter.

Slidably seated on the preload insert cylinder 44 and in the circumferential recess 38 of the precision insert 22 is a plug body generally designated by the numeral 52. Its axial length is such that its inner end terminates inwardly of the inner end of the large diameter portion of the preload insert cylinder 44. Its outer end portion 54 is of reduced diameter providing a wall thickness substantially equal to the depth of the circumferential recess 38 in which it seats. At a point spaced about its periphery, the outer end portion 54 has a keyway 56 which acts as a keyway for alignment purposes with the keyway 40 of the precision insert 22.

At the inner end of the reduced diameter outer end portion 54 is a radial flange 58 extending circumferentially thereabout and providing a step or shoulder 59 in its outer face. Rotatably seated on the radial flange 58 is a plug nut generally designated by the numeral 60 with a generally circular recess 62 extending axially inwardly from its outer end and having the sidewall of this recess internally threaded to effect threaded engagement with a cooperating surface on the receptacle.

Threadably engaged on the threaded portion 46 of the preload insert cylinder 44 is a tensioning nut 64 which bears against the washer 66 and through it against the inner end of the plug body 52. As best seen in FIG. 3, the outer jacket 20 of the cable 10 has been cut back to a substantial distance, and the fiber optic conductors 11 extend outwardly therefrom and through the preload insert cylinder 44. The fiber optic filaments 12, stripped of cylindrical jacket, pass through the passages 27 of the precision insert 22 to the outer face thereof. In the smaller diameterportion 32 of the recess 28 in the precision insert 22, the fiber optic conductors 11 are seated in a rigid resin 68. Extending inwardly from the resin 68 is another encapsulating resin 70 filling the space within the preload insert cylinder 44 to its reduced diameter end portion 48. The reduced diameter inner end portion 48 is filled with a compressible or elastomeric resin 72. The reduced diameter end portion 48 is crimped to apply pressure to the elastomeric resin 72 so that the resin presses against the outer surfaces of the fiber optic conductors 11 and the inner surface of the reduced diameter end portion 48 to provide a sealing action to minimize the potential for water penetration.

As seen in FIG. 3, the strength member 18 also extends outwardly of the matrix 16 and outer jacket 20, and it is formed over the reduced diameter inner end portion 48 of the preload insert cylinder 44. A crimping sleeve 74 is placed thereover and tightened so as to compress the reduced diameter inner end portion 48 onto the elastomeric polymer 72 to ensure a strong connection between the cable strength member 18 and the body of the connector. A series of O-rings 76, 78, 80 and 82 are provided to provide sealing action and to minimize the potential for water penetration as will be more fully described hereinafter.

Lastly, there is provided a boot 84 of an elastomeric synthetic resin which is molded about the jacketed portion of the cable 10 and extends over the plug body 52 to a point adjacent the plug nut 60.

In assembling the connector to the end of a fiber optic cable 10, the jacket 20 is stripped back to expose the strength member 18, conductors 11, and matrix resin 16. The strength member 18 is peeled back for a distance and the conductors 11 are extracted from the matrix resin 16. At their ends, the conductors 11 are stripped of the jackets 14 and the bare filaments 12 are inserted into the axial passages 27 of the precision insert 22 so as to project from the outer face thereof. The resin 68 is utilized to encapsulate the conductors 11 in the small diameter portion 32 of the recess 28 in the precision insert 22 and encapsulate the filaments 12 in the axial passages 27 in the precision insert 22. In the next step, the plug body 52 is slid over the cable 10 and onto the circumferential recess 38 of the precision insert 22 and over the O-ring 76 with its keyway 56 aligned with the keyway 40 of the precision insert 22. The plug nut 60 is then slid over the cable 10 and onto the plug body 52 against the radial flange 58. The preload insert cylinder 44 is then slid forwardly over the cable 10 and into the plug body 52 and larger diameter portion 30 of the recess 28 of the precision insert 22, and it is threaded tightly into the larger diameter portion 30.

At this point, an O-ring 78 is slid thereover and against the inner end of the plug body 52, and it is then followed by the washer 66. Finally, the tensioning nut 64 is threaded against the washer 66.

At this time, or prior to this time, the protruding ends of the fiber optic filaments 12 are polished so that they are flush with the outer face of the precision insert 22. The precision insert 22 is placed in a fixture which has projections registering with the triangular recesses 24 and keyway 40 and keyway 56 so as to firmly position the insert for further operations. With the precision insert 22 now firmly held against rotation, the tensioning nut 64 is tightened on the preload insert cylinder 44 against the inner end of the plug body 52 until the tension reaches a value equal to or exceeding the design pressure times the cross sectional area of the preload insert cylinder 44.

After this tensioning has been accomplished, a high strength resin such as a glass filled epoxy is introduced into the preload insert cylinder 44 in a volume sufficient to fill that portion which extends to the reduced diameter inner end portion 48. After curing of this resin formulation, an elastomeric resin is introduced into the remaining portion of the preload insert cylinder 44 and cured. Then the reduced diameter end portion 48 is crimped to apply pressure to the elastomeric resin 72 so that the resin presses against the outer surfaces of the fiber optic conductors 11 and the inner surface of the reduced diameter end portion 48 to provide sealing action to minimize the potential for water penetration.

The strength member 18 is now expanded and placed over the reduced diameter inner end portion 48 of the preload insert cylinder 44. The crimping sleeve 74 is placed thereover and tightened sufficiently to firmly clamp the strength member 18 onto the preload insert cylinder 44.

As a last step, the cable 10 and connector are placed within a suitable mold and an elastomeric synthetic resin is formed thereabout to produce the boot 84.

The boot 84 is conveniently molded from a polyurethane having a durometer of 50-60, and the compressible resin in the insert cylinder is also a polyurethane with a durometer of about 25-35. The resin in the major portion of the insert cylinder must withstand high pressures, i.e., have high compressible strength, and is conveniently a glass-filled epoxy resin. The resin about the glass filaments in the smaller diameter recess is desirably an epoxy specially formulated for bonding optical fibers.

When the connector of the present invention is mated with a cooperating receptacle, O-ring seals 80 and 82 effect sealing engagement with surfaces of the mating receptacle. The O-rings 76 and 78 and compressible resin 72, acting with the crimped reduced diameter end portion 48 provide seals which eliminate the potential for water seepage inwardly of the connector structure. The circular recesses 26 in the outer face of the precision insert 22 provide means for alignment with pins in the receptacle which seat therein. By preloading the cylinder insert, external hydrostatic pressure acting on the connector will not result in longitudinal motion of the preload insert cylinder or of the precision insert. This will maintain the integrity of the sealing action provided by the resin molded within the preload insert cylinder and of the elastomeric seals. As can be seen, there are two sets of seals at the inner end against water intrusion. The first is the O-ring 78 between the plug body member 52 and the preload cylinder 44, and the second is the sealing action provided by the compression of the elastomeric resin about the tubular jackets of the conductors by the crimping sleeve. Thus, the possibility for water travelling along the conductors or along one of the internal inner faces of the filaments is reduced.

The second set of sealing action against water intrusion is provided by the O-ring seals between the precision insert and the plug body and the resin seal between the precision insert about the axial passages and the filaments which are extending there through.

Thus, it can be seen from the foregoing detailed specification and attached drawings that the fiber optic connector of the present invention is readily adapted to use in high pressure environments since the effect of the pressures will not cause dislocation of the components, and the integrity of the sealing action is substantially maintained. The structure lends itself to use at various pressures by the amount of pressure applied to the preload insert cylinder. The components may be readily fabricated and assembled to provide a long lived assembly.

What is claimed is:

1. A fiber optic cable connection for high pressure environments comprising:

a fiber optic cable having (i) a multiplicity of fiber optic strands extending axially therein, (ii) a strength member extending axially in spaced relationship thereabout, (iii) an outer jacket, and (iv) a filler matrix within said strength member and in which said strands are encased;

a precision connector member of generally circular cross section having an outer face configured to mate with a cooperating connector member and an inner face having an axially extending recess, said connector member having axially extending passages extending from the transverse wall of said recess to said outer face of said connector member, said strands extending axially outwardly of said strength member and filler matrix of said cable and through said passages to said outer face of said connector member;

a generally cylindrical preload insert member extending axially about said outwardly extending portion of said strands and having its outer end extending into said recess of said connector member and a peripheral shoulder abutting the inner face of said connector member, said strength member having its outer end portion extending outwardly of the end of said jacket and onto the inner end portion of said insert member;

a body member of circular cross section dispensed axially about said insert member and having its outer end extending over the inner end portion of the connector member, said body member having a radially outwardly extending flange about the periphery thereof;

a nut threadably engaged on said insert member and abutting against the inner end of said body member, said nut being tightened on said insert member against said body member to tension the insert member above a predetermined value;

a relatively rigid resin filler in said insert member about said strands; and a sealing boot extending about said cable jacket over said strength member and nut and onto said body member.

2. The cable connection in accordance with claim 1 wherein a rigid synthetic resin is provided about said strands in the portion of said connector member resins adjacent its transverse wall.

3. The cable connection in accordance with claim 1 wherein said insert member has an inner end portion with a relative thin wall and wherein a relatively compressible resin filler is provided about said strands in said thin wall inner end portion of said insert member.

4. The cable connection in accordance with claim 3 wherein there is included a relatively compressible resin filler about said strands in said thin wall inner end portion of said insert member.

5. The cable connection in accordance with claim 4 wherein there is included clamping means clamping said strength member onto said inner end portion of said insert member.

6. The cable connection in accordance with claim 5 wherein said clamping means is a crimping sleeve.

7. The cable connection in accordance with claim 1 wherein said outer end portion of said insert member is threadably engaged with said connector member.

8. The cable connection in accordance with claim 1 wherein there is included a coupling nut extending about said body member with an inwardly extending flange on its inner end abutting the inner face of said flange on said body member and having coupling means in its outer portion for engagement with cooperating coupling means of the cooperating connector member.

9. The cable connection in accordance with claim 1 wherein said insert member has an outer end portion of lesser diameter extending inwardly of said recess in said connector member and providing said shoulder abutting the inner face thereof.

10. The cable connection in accordance with claim 1 wherein said connector member has an axially extending recess in its outer surface and the outer end of said body member has a portion which extends thereinto.

11. The cable connection in accordance with claim 1 wherein said connector member has a circumferential groove underlying said body member and sealing means is seated therein to effect a seal between said connector and said body member.

12. The cable connection in accordance with claim 1 wherein there is included a washer between said nut and body member.

13. The cable connection in accordance with claim 1 wherein the outer face of said connector member has recesses therein to effect alignment with the cooperating connector member.

14. A fiber optic cable connection for high pressure environments comprising:
 a fiber optic cable having (i) a multiplicity of fiber optic strands extending axially therein, (ii) a strength member extending axially in spaced relationship thereabout, (iii) an outer jacket, and (iv) a filler matrix within said strength member and in which said strands are encased;
 a precision connector member of generally circular cross section having an outer face configured to mate with a cooperating connector member and an inner face having an axially extending recess, said connector member having axially extending passages extending from the transverse wall of said recess to said outer face of said connector member, said strands extending axially outwardly of said strength member and filler matrix of said cable and through said passages to said outer face of said connector member;
 a rigid synthetic resin about said outwardly extending portion of said strands in the portion of said recess adjacent said transverse wall;
 a generally cylindrical preload insert member extending axially about said outwardly extending portion of said strands and having its outer end extending into said recess of said connector member and a peripheral shoulder abutting the inner face of said connector member, the inner end portion of said insert member being of reduced diameter and providing a relatively thin wall, said strength member having its outer end portion extending outwardly of the end of said jacket and onto said reduced diameter portion of said insert member;
 a body member of circular cross section disposed axially about said insert member and having its outer end extending over the inner end portion of the connector member, said body member having a radially outwardly extending flange about the periphery thereof;
 a nut threadably engaged on the inner end portion of said insert member, and abutting against the inner end of said body member, said nut being tightened on said insert member against said body member to tension the insert member above a predetermined value;
 a relatively compressible resin filler about said outwardly extending portion of said strands in said reduced diameter portion of said insert member;
 a relatively rigid resin filler in said insert member about said strands between said relatively compressible filler and said connector member;
 clamping means clamping said strength member to said reduced diameter inner end portion of said preload insert member; and
 a sealing boot extending about said cable jacket over said strength member and nut and onto said body member.

15. The cable connection in accordance with claim 14 wherein there is included a coupling nut extending about said body member with an inwardly extending flange on its inner end abutting the inner face of said flange on said body member and having coupling means in its outer portion for engagement with cooperating coupling means of the cooperating connector member.

16. The cable connection in accordance with claim 14 wherein said connector member has a plurality of axially extending grooves in its outer surface and the outer end of said body member has portions which extend thereinto.

17. The cable connection in accordance with claim 14 wherein the outer face of said connector member has recesses therein to effect alignment with the cooperating connector member.

18. The cable connection in accordance with claim 14 wherein said insert member has an outer end portion of lesser diameter extending inwardly of said recess in said connector member and providing said shoulder abutting the inner face thereof.

19. The cable connection in accordance with claim 14 wherein said connector member has a circumferential groove underlying said body member and sealing means is seated therein to effect a seal between said connector and said body member.

20. The cable connection in accordance with claim 14 wherein there is included a washer between said nut and body member.

21. The cable connection in accordance with claim 14 wherein said clamping means is a crimping sleeve.

* * * * *